US007781545B2

(12) United States Patent
Weickert et al.

(10) Patent No.: US 7,781,545 B2
(45) Date of Patent: Aug. 24, 2010

(54) PROCESS FOR THE CATALYTIC POLYMERIZATION OF OLEFINS, A REACTOR SYSTEM, ITS USE IN THE PROCESS, THE POLYOLEFINS OBTAINED AND THEIR USE

(75) Inventors: Gunter Weickert, Ahaus (DE); Bill Benjamin Rudolf Gustafsson, Stenungsund (SE)

(73) Assignee: Borealis Technology Oy, Porvoo (FI)

( * ) Notice: Subject to any disclaimer, the term of this patent is extended or adjusted under 35 U.S.C. 154(b) by 777 days.

(21) Appl. No.: 10/559,965

(22) PCT Filed: May 11, 2004

(86) PCT No.: PCT/EP2004/005076

§ 371 (c)(1),
(2), (4) Date: Aug. 21, 2006

(87) PCT Pub. No.: WO2004/111095

PCT Pub. Date: Dec. 23, 2004

(65) Prior Publication Data

US 2007/0100093 A1    May 3, 2007

(30) Foreign Application Priority Data

Jun. 6, 2003    (EP)    .................................. 03076791

(51) Int. Cl.
*C08F 2/00* (2006.01)
*C08F 4/44* (2006.01)
*B01J 19/18* (2006.01)
*B01J 8/18* (2006.01)

(52) U.S. Cl. .............................. 526/64; 526/65; 526/88; 526/128; 526/129; 422/132; 422/134; 422/139

(58) Field of Classification Search ................... 526/65, 526/64, 88, 128, 129, 901; 422/132, 134, 422/139
See application file for complete search history.

(56) References Cited

U.S. PATENT DOCUMENTS

| 2,763,599 | A | 9/1956 | Matheson et al. |
| 5,656,243 | A | 8/1997 | Luckenbach et al. |
| 6,469,110 | B1 * | 10/2002 | Harlin et al. .................. 526/65 |
| 7,414,098 | B2 | 8/2008 | Covezzi et al. |

(Continued)

FOREIGN PATENT DOCUMENTS

DE    39 16 325 A    11/1990

(Continued)

*Primary Examiner*—William K Cheung
(74) *Attorney, Agent, or Firm*—The Webb Law Firm

(57) ABSTRACT

The present invention relates to a process for the catalytic polymerization of olefins comprising the steps of; i) a first polymerization in a first reactor, wherein olefins are polymerized with a particulate catalyst, hydrogen and optional a comonomer in a fluidum of an inert low boiling hydrocarbon medium into an reaction mixture comprising polymerized olefins; and ii) a second polymerization in a second reactor, wherein the polymerized olefins are further polymerized in a fluidized bed and in a moving bed under such conditions that the residence time in the fluidized bed and the residence time in the moving bed are independently controlled to a reactor system for carrying out said process, to the use of the reactor system, the polyolefins obtainable with said method and to the use of these polyolefins.

34 Claims, 9 Drawing Sheets

U.S. PATENT DOCUMENTS

2007/0032616 A1   2/2007   Weickert

FOREIGN PATENT DOCUMENTS

Figure 1:
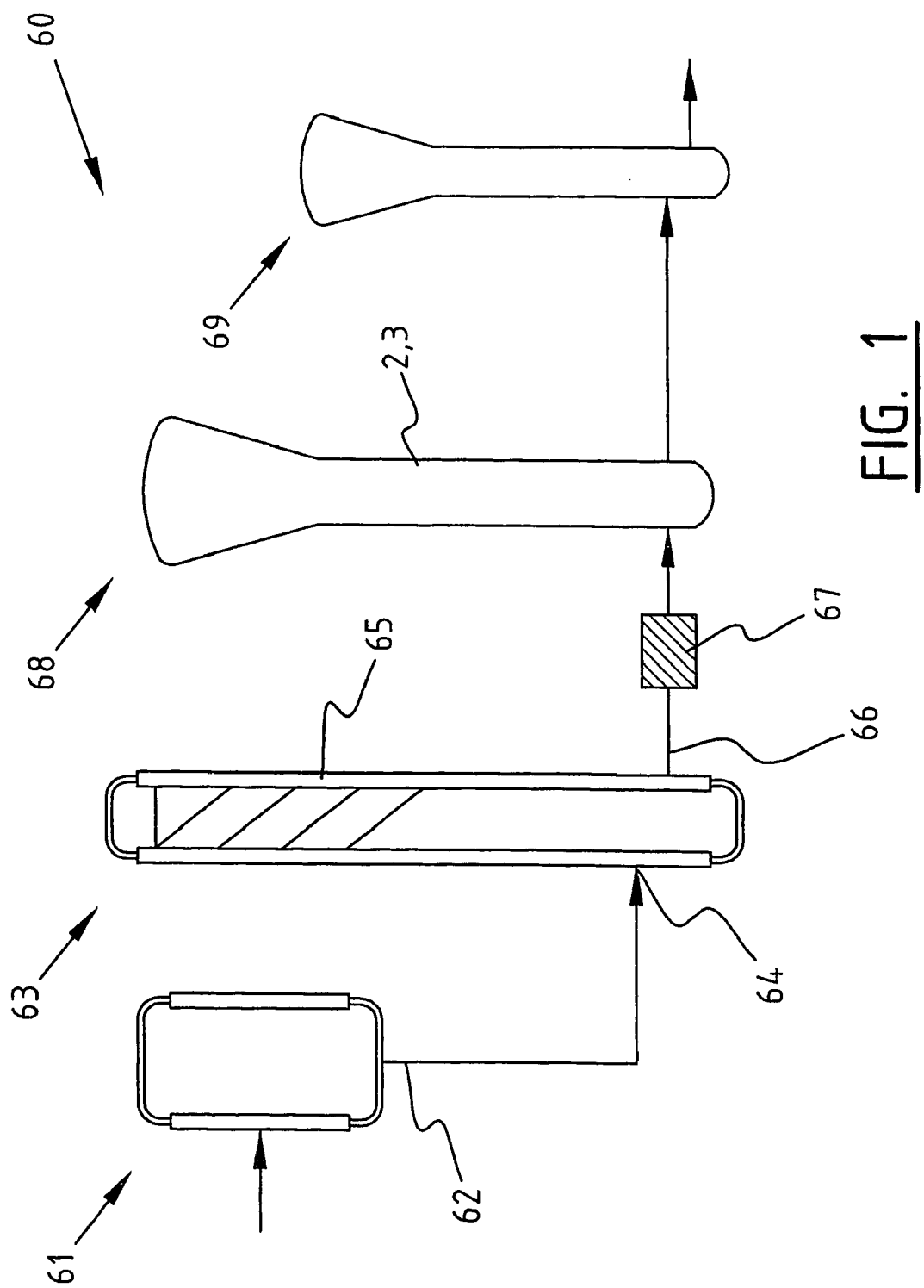

| EP | 0 517 868 | 12/1992 |
| WO | WO 00/02929 | 1/2000 |
| WO | WO 00/69552 | 11/2000 |
| WO | WO 02/41986 A | 5/2002 |
| WO | WO 02/41986 A1 * | 5/2002 |
| WO | 2004111096 A1 | 12/2004 |

* cited by examiner

PROCESS FOR THE CATALYTIC POLYMERIZATION OF OLEFINS, A REACTOR SYSTEM, ITS USE IN THE PROCESS, THE POLYOLEFINS OBTAINED AND THEIR USE

The present invention relates to a process for the catalytic polymerisation of olefins, to a particular reaction system, to the use of this reactor system for the catalytic polymerization of olefins, to the polyolefins obtained by the said process and to the use of the polyolefins.

The catalytic polymerization of polyolefins uses a catalyst of the Ziegler-Natta type. New generations of catalyst for olefin polymerization including single site catalysts referred to as Ziegler-Natta catalysts have been developed in view of a higher activity and/or selectivity. During the catalytic polymerization the olefin composition is substantially constant around the particle. Reactor gasses exiting the reactor are compressed and recycled. Make-up monomers and optionally hydrogen are added as needed. Entrained particles can be separated by an interposed cyclone and recycled to the polymerization reactor.

Polyolefins produced using a recent generation of Ziegler-Natta catalysts have a relative narrow molecular weight distribution. The breadth of the molecular weight distribution influences the rheology behaviour and the final mechanical properties of the produced polyolefins.

In order to obtain a broader bimodal molecular weight distribution, use is made of different reactor conditions, such as different concentrations for monomer, comonomer and/or hydrogen. Another option is the use of specific and/or combined catalysts.

Traditionally, series of reactors are used for applying different reaction conditions during the catalytic polymerization in order to obtain a broad or bimodal molecular weight distribution.

The use of one or more fluidized bed reactors in combination with a liquid phase reactor is for example described in EP 0517 868. Herein the use of a multi-stage process for producing bimodal polyolefins and polyolefins with a broad molecular weight distribution is described. This multi-state process comprises a first reactor for carrying out a first polymerization reaction, a second reactor for carrying out a second polymerization and optionally a third reactor for carrying out a third polymerization. The first reactor is a loop reactor wherein olefins are polymerized in an inert hydrocarbon medium. The second and third reactor are fluidized bed reactors such as gas phase reactors. It is an object of the present invention to further improve a process like the mentioned process. In relation to a enhanced homogeneity, improvement of the molecular weight distribution resulting in an improvement of the strength of the product and a more even comonomer distribution. Possibly a second gas phase rector is no longer necessary.

A first aspect of the present invention relates to a process for the catalytic polymerization of olefins comprising the steps of;
i) a first polymerization in a first reactor, wherein olefins are polymerized with a particulate catalyst, hydrogen and optional a comonomer in a fluidum of an inert low boiling hydrocarbon medium into an reaction mixture comprising polymerized olefins; and
ii) a second polymerization in a second reactor, wherein the polymerized olefins are further polymerized in a fluidized bed and in a moving bed under such conditions that the residence time in the fluidized bed and the residence time in the moving bed are independently controlled.

With this process it is feasable to provide a variety of polyolefins, such as monomodal and bimodal products with an improved polydispersity and/or bimodality/multimodality. Further, it is possible to control the built up of the polyolefin particles, such that a desired number and thickness of the polymeric layers is obtained.

Preferably, the inert low boiling hydrocarbom medium comprises propane, butane, isobutane pentane, hexane, heptane, octane, cyclohexane or cycloheptane, or other not interfering media because they do not interfere with the polymerization process of the olefins.

Further, it is also possible to us a mixture of any of these hydrocarbons.

The first polymerization is preferably carried out in a liquid phase. The advantage of carrying out the first polymerization in a liquid phase is that the reactor is relatively simple to control, and that a fairly good heat transfer takes place.

Preferably, the first polymerization is carried out at a temperature of about 75° to 110° C. and a pressure of 40-90 bar. Between these temperature and pressure values the best yield is obtained when a liquid phase is used.

In a preferred embodiment of the present invention thefirst polymerization of olefins is carried out under supercritical conditions, wherein the polymerization temperature and pressure are above the corresponding critical points of the mixture formed by the olefins, catalyst, hydrogen, optional comonomer and fluidum of inert low boiling hydrocarbon medium and the polymerization temperature is below the melting point of the formed polymerized olefins. The temperature and pressure in the first reactor are preferably about 85°-110° C. and 60-90 bar, respectively.

By using supercritical conditions it is possible to use higher hydrogen concentrations as would be possible in subcritical conditions. Further, in supercritical conditions there is in the reactor practically one single reaction fluid, where no separate liquid and gas phase can be detected. This gives very a very good heat transfer, a free mixing of gas components in the fluid and a low viscosity of the reaction mixture.

The reactor mixture is removed from the first reactor either continuously or intermittently. Preferably, hydrogen, unreacted reactants and inert low boiling hydrocarbon medium are removed from the reaction mixture. The removal of hydrogen, low boiling hydrocarbon is preferably carried out by flashing means.

After the reaction mixture has been removed from the first reactor and hydrogen, unreacted reactants and inert low boiling hydrocarbon medium are also removed, the polymerized olefins are fed into the second reactor.

In this second reactor the polymerized olefins are fed into a fluidized bed and in a moving bed. In the fluidized bed and the moving bed the residence times may be controlled and adjusted relative to the total process residence time independently. During the total residence time of the process the polymeric particles are recycled during a number of cycles. The number of cycles in the fluidized bed and in the moving bed may be selected as desired with the present process according to the invention. Thus, it is possible to build up polymeric particles with the desired number and thickness of polymeric layers formed consecutively in the fluidized bed and moving bed.

According to a preferred embodiment is the residence time in the moving bed independently controlled, for instance by controlling the amount of polymeric particles entering the moving bed but more preferably by controlling the outflow of polymeric particles out of the moving bed. The control of outflow rate may have the form of adjusting the opening in the outlet of the moving bed.

In the moving bed are the catalytic polymerization conditions different compared to those in the fluidized bed. First, because the catalytic particles have a higher density in the moving bed. Furthermore, in order to apply different polymerization conditions use is made of a separation fluidum in order to create different catalytic polymerization conditions. For example, a polymerization carried out at a lower concentration of a chaingrowth terminating agent such as hydrogen. Applying a separating fluidum to the moving bed results in a separation in reaction conditions between the fluidized bed and the moving bed thereby in the residing polymerization conditions in the fluidized bed and the moving bed. Preferably the separation fluidum is added to the top of the moving bed and forms a cushion on the moving bed through which cushion of separating fluidum the particulate polymeric material settles on the forming moving bed. The separation fluidum may be a gas or a liquid. The separation fluidum may be inert to the catalytic polymerization such as nitrogen and $C_1$-$C_{12}$-alkane.

The separation fluidum may be reactive such as monomer, comonomer such as $C_2$-$C_{12}$-alkylene or mixtures thereof. Mixtures of inert and catalytic polymerization reactive separation fluidum may be used as desired.

Preferably, use is made of a separation fluidum which is a liquid which evaporates under the conditions residing during the catalytic polymerization in the moving bed. Accordingly, during evaporation a gas cushion of separating fluidum is formed and at the same time a cooling of the exothermic polymerization reaction occurs with at the same time a much higher reactant concentration when using reactive separation fluidum.

The addition of separation fluidum but also the reactant to both fluidized bed and moving bed may be such that in the fluidized bed and/or in the moving bed a condensed mode polymerization occurs which is beneficial to productivity and selectivity.

It is further preferred when the separation fluidum comprises a polymerization monomer or comonomer or mixture thereof.

In order to be able to add a rubber component to the polyolefins formed in the second polymerization, it is preferred to carry out a third polymerization in a third reactor. This is preferably carried out in a gas phase reactor. It is even more preferred if in the third reactor the polymerized olefins are further polymerized in a fluidized bed and in a moving bed such that the residence time in the fluidized bed and the residence time in the moving bed are independently controlled.

Before the first polymerization in the first reactor takes place, a pre-polymerisation is preferably carried out. In such a pre-polymerisation step the activity of the catalyst is controlled.

Another aspect of the present invention relates to a reactor system for the catalytic polymerization of olefins comprising a first polymerization reactor for carrying out the first polymerization, which first reactor comprises inlets for olefins, catalyst, hydrogen, optional comonomer, and inert low boiling hydrocarbon medium, the first reactor further comprises a product outlet for a reaction mixture comprising polymerized olefins; and wherein the product outlet of the first reactor is connected to an inlet of a second reactor for carrying out the second polymerization, which second reactor comprises a reactant inlet, a fluidized bed unit, a moving bed unit and a product outlet, wherein the fluidized bed unit comprises means for maintaining a fluidized bed in the fluidized bed unit and wherein the moving bed unit is provided with an inlet directly connected to the fluidized bed unit such that the residence time in the fluidized bed unit and the residence time in the moving bed unit are independently controlled.

A first advantage of this reactor system is that it is possible to provide a variety of polyolefins, such as monomodal and bimodal products with a desired polydispersity and/or biomodaltiy. A second advantage is that it is possible to control the built up of the polyolefin particles, such that a desired number and thickness of the polymeric layers is obtained.

The first reactor preferably comprises a loop reactor. A loop reactor has several advantages over other reactors. The most important advantages of a loop reactor is that it has a better heat transfer from the reaction mixture and therefore a more even temperature profile, a higher slurry density and consequently a better mixing. An other advantage of a loop reactor is that it permits shorter residence times and as a consequence the catalyst has not time to inactivate considerably. This means that when the catalyst is transferred from the loop reactor to the second reactor it is still very active.

The loop reactor is preferably adapted such that it can work under supercritical conditions. By using supercritical conditions it is possible to use higher hydrogen concentrations as would be possible in subcritical conditions. Further, in supercritical conditions there is in the reactor practically one single reaction fluid, where no separate liquid and gas phase can be detected. This gives very a very good heat transfer, a free mixing of gas components in the fluid and a low viscosity of the reaction mixture.

In order to remove hydrogen, unreacted reactants and inert low boiling hydrocarbons from the polymerized olefins, is the product outlet of the first reactor preferably connected to removal means. These removal means comprise an outlet for the polymerized olefins that is connected to the inlet of the second reactor. The removal means preferably comprise flashing means.

The moving bed unit is connected to the fluidized bed such that a desired part or all fluidized bed reactant is passed through the moving bed unit. The residence time in the moving bed unit is controlled by controlling the outflow rate at the outlet of the moving bed unit. When the moving bed unit is filled with particulate polymeric material then no further particulate material form the fluidized bed unit may be added to the moving bed unit and is to be recycled in the fluidized bed unit. The extent of fluidization and filling of the fluidized bed unit determines the residence time of the particulate polymeric material in the fluidized bed unit prior to changing over into the moving bed unit. In the moving bed unit the residence time is dependent on the outflow rate and the particulate polymeric materials follows one cycle within the moving bed unit after entering it.

When in the fluidized bed unit and in the moving bed unit different polymeric reaction conditions reside, then the polymeric particle formed will comprise layers of different polymeric material due to the different polymeric material formed on the particle.

In order to independently control the residence time in the fluidized bed unit and in particular in the moving bed unit, the inlet of the moving bed unit is arranged in the fluidized bed unit so that part of the material from the fluidized bed unit may be transferred into the moving bed unit whereas the other remaining part is further fluidized and mixed in the fluidized bed unit. Generally, the material leaving the moving bed unit is transferred into the fluidized bed unit and ultimately removed from the fluidized bed unit. However, product may also be removed from the moving bed unit.

Various orientations of the fluidized bed unit and of the moving bed unit are contemplated while still the residence time in the fluidized bed unit and in the moving bed unit may be controlled independently. In one embodiment the moving bed unit is arranged within the fluidized bed unit. In an other embodiment the moving bed reactor is arranged around the fluidized bed reactor and has a substantially annular configuration. In another embodiment, the moving bed reactor is arranged adjacent or even outside the fluidized bed unit while its inlet and optionally its outlet are arranged in the fluidized bed unit. Preferably (as discussed above), the moving bed reactor is provided at least at its inlet with means for supplying the separation fluidum. This separation fluidum is preferably a gas or a liquid and selected from the group comprising an inert gas or liquid, such as nitrogen and $C_1$-$C_{12}$-alkene, or $C_3$-$C_{12}$-alkylene.

The moving bed unit may be provided with a diverging section such that as from its inlet the unit volume increases thereby allowing a better separation of particulate material entering the moving bed form material which is recycled in the fluidized bed. In another embodiment, the moving bed unit may be provided with a converging section as from its inlet providing a more stable fluidized bed around the moving bed unit In order to control residence time in the moving bed unit, its outlet is preferably provided with means for controlling the outflow rate of particles from the moving bed. Those outflow rate controlling means may have the form of a valve or any form of construction element suitable for controlling the outflow rate.

The reactor system according to the invention preferably comprises a pre-polymerisation unit connected to the catalyst inlet of the first polymerization reactor.

In a preferred embodiment the reaction system further comprises a third reactor for carrying out a third polymerization, which third reactor is connected to the second reactor. The third reactor is preferably a gas phase reactor. It is even more preferred if the third reactor comprises a reactant inlet, a fluidized bed unit, a moving bed unit and a product outlet, wherein the fluidized bed unit comprises means for maintaining a fluidized bed in the fluidized bed unit and wherein the moving bed unit is provided with an inlet directly connected to the fluidized bed unit such that the residence time in the fluidized bed unit and the residence time in the moving bed unit are independently controlled. The preferred embodiments of the third reactor may be the same as the preferred embodiments of the second reactor.

The reactor system according to the invention preferably also comprises a pre-polymerisation reactor. In such a pre-polymerisation step the activity of the catalyst is controlled.

When producing polypropylene the first polymerization reactor may comprise propylene as the medium and further if desired comonomer(s), hydrogen and conventional inerts.

The present invention further relates to the use of a reactor system according to the invention for the polymerization of polyolefins.

An other aspect of the present invention relates to polyolefins obtainable by the process according to the invention.

A final aspect of the present invention relates to the use of the polyolefins obtained with the process according to the invention in pipes, blow molded articles, coating of metal pipes, jacking of cables, extrusion coating, films and insulation layers of cables.

Mentioned and other features and advantages of the process and the reactor system according to the invention are further explained by way of several embodiments given for illustrative purposes and without the intention to limit the invention thereto, while making references to the figures. In the figures are:

FIG. 1 a schematic diagram of the reactor system according to the invention;

FIGS. 2-6 a schematic diagram of the second reactor used in the reactor system according to the invention;

FIGS. 7-16 molecular weight distributions obtained with a process exemplified in the examples 1, 2, 3 and 4, respectively.

FIG. 1 shows a reactor system according to the invention for the catalytic polymerization of olefins. Olefins used in the process according to the invention comprise $C_2$-$C_{12}$-olefins, preferably $C_2$-$C_8$-olefins such as ethylene, propylene, butene-1, pentene-1, hexene-1, 4-methyl, pentene-1 and octene. These olefins may also be used for the production of homopolymers. Copolymers may be produced by using for instance ethylene and/or propylene in combination with other $C_2$-$C_8$-alpha-olefins. Polyenes may be used for copolymerization, such as dienes, for instance 1,4-butadiene, 1,6-hexadiene, dicyclopentadiene, ethylidene norbornene and vinyl norbornene.

For this catalytic polymerization Ziegler-Natta-catalysts are used which are conventional catalysts available in the are and selected and desired.

The reactor system 60 comprises a pre-polymerisation reactor 61 for the pre-polymerisation of the catalyst. The outlet 62 of the pre-polymerization reactor 61 is connected to the inlet 64 of the first polymerization reactor 63. The polymerization comprises a reaction chamber 65 which is adapted to work under supercritical conditions. The outlet 66 of the polymerization reactor 63 is connected to flashing means 67 for separating the polymerized olefins from the inert low boiling hydrocarbon medium, unreacted reactants and hydrogen. The flashing means are connected to a second polymerization reactor 68. This second polymerization reactor 68 comprises a fluidized bed unit 2 and a moving bed unit 3. The outlet of the second polymerization reactor 68 is optionally connected to the inlet of a third polymerization reactor 69. Optionally comonomer may be added to the reactor 61 and/or reactor 63.

Figure 2:
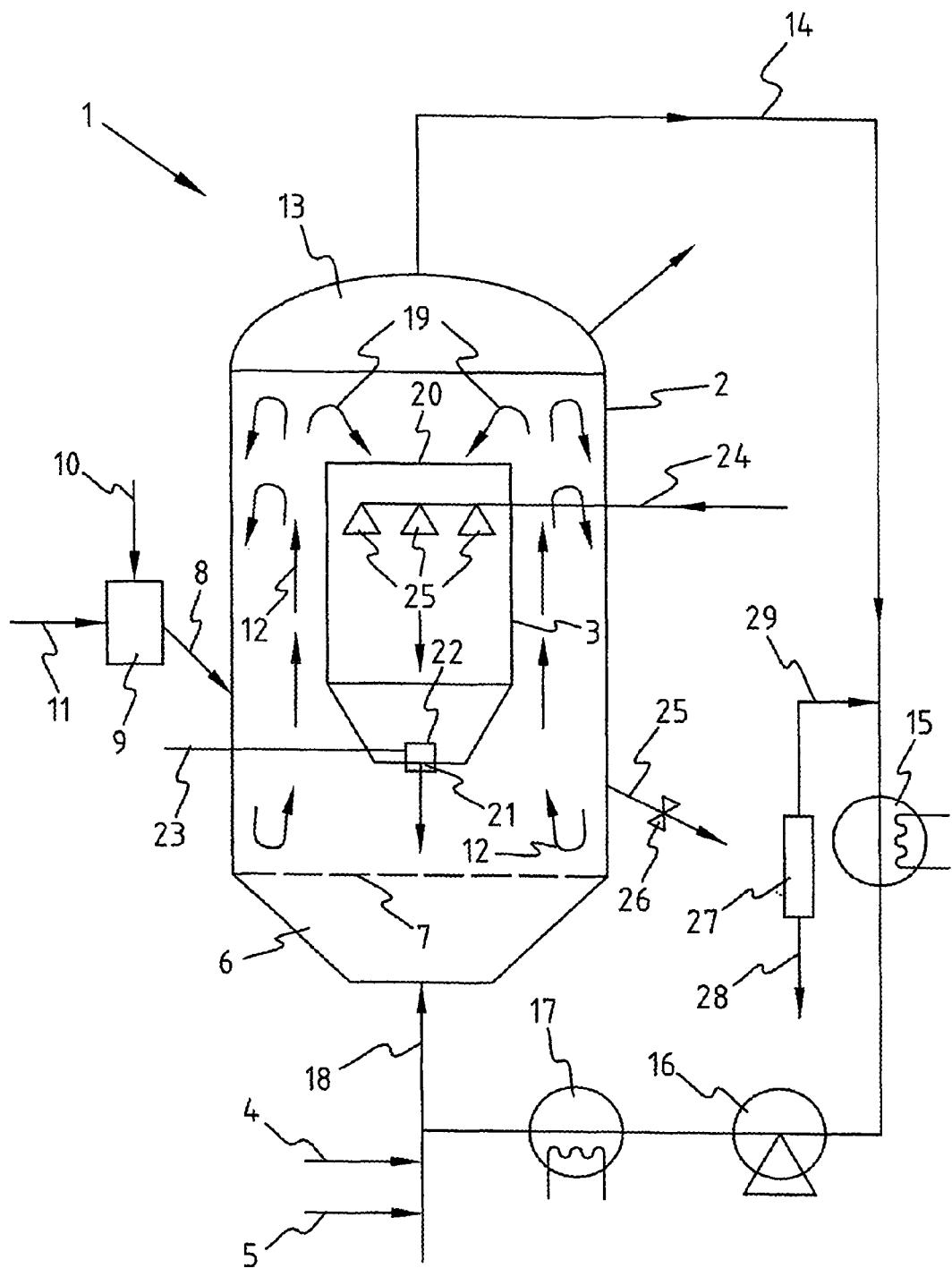

FIG. 2 shows the second polymerizing reactor 68 according to the invention, this reactor is described in the European patent application EP03076791 is incorporated by cross-reference. The second polymerizing reactor 68 comprises a fluidized bed unit 2 within which is centrally arranged a moving bed unit 3.

Monomer is entering the fluidized bed unit via line 4 and optionally via line 5 inert gas, comonomer and/or hydrogen.

Via a lower space 6 and a gas distribution plate 7 the reaction gas enters the fluidized bed unit 2. Via line 8 polymer of the previous polymerization is added from a unit 9 via line 10 and other catalyst components via line 11, and optionally catalyst compounds may be added.

Sidewise around the moving bed unit 3 is generated and maintained a fluidized bed of catalytic particles on which particles due to the polymerization reaction polymer is formed. The composition of the polymer formed is dependent in the residing concentration of the monomer, comonomer, inert and hydrogen. The maintained fluidized bed is visualized by the arrows 12. At the top of the fluidized bed reactor particles are separated from gas in a disengaging section 13. Gas leaves the fluidized bed unit via the recirculation line 14, is optionally cooled in a heat exchanger 15. compressed in a compressor 16 and optionally after further cooling in heat exchanger 17 re-added to the fluidized bed unit 2 via its inlet 18.

Part of the particulate material in the fluidized bed unit 2 visualized by arrows 19 enter the moving bed unit and forms a bed of settled polymeric particles which move slowly downwardly in a more or less plug stream towards the outlet 21 which is partly closed off by a valve 22 control via a control line 23. On the downwardly moving bed of polymeric particles in the moving bed 3 is formed a cushion of separation fluidum which is added via the line 24 and the nozzles 25. This separation fluidum is in this case a liquid which evaporates under the conditions residing at the top of the moving bed. The top part of the moving bed, above the nozzles 25 is preferably fluidized by upstreaming evaporated separation fluidum.

After a sufficient total residence time in both the fluidized bed unit 2 and the moving bed unit 31 polymer is removed via the outlet 25 provided with a valve 26. In a separator 27 polymeric material is separated and removed via outlet 28 whereas gaseous material is recycled via line 29 and line 14.

Figure 3:
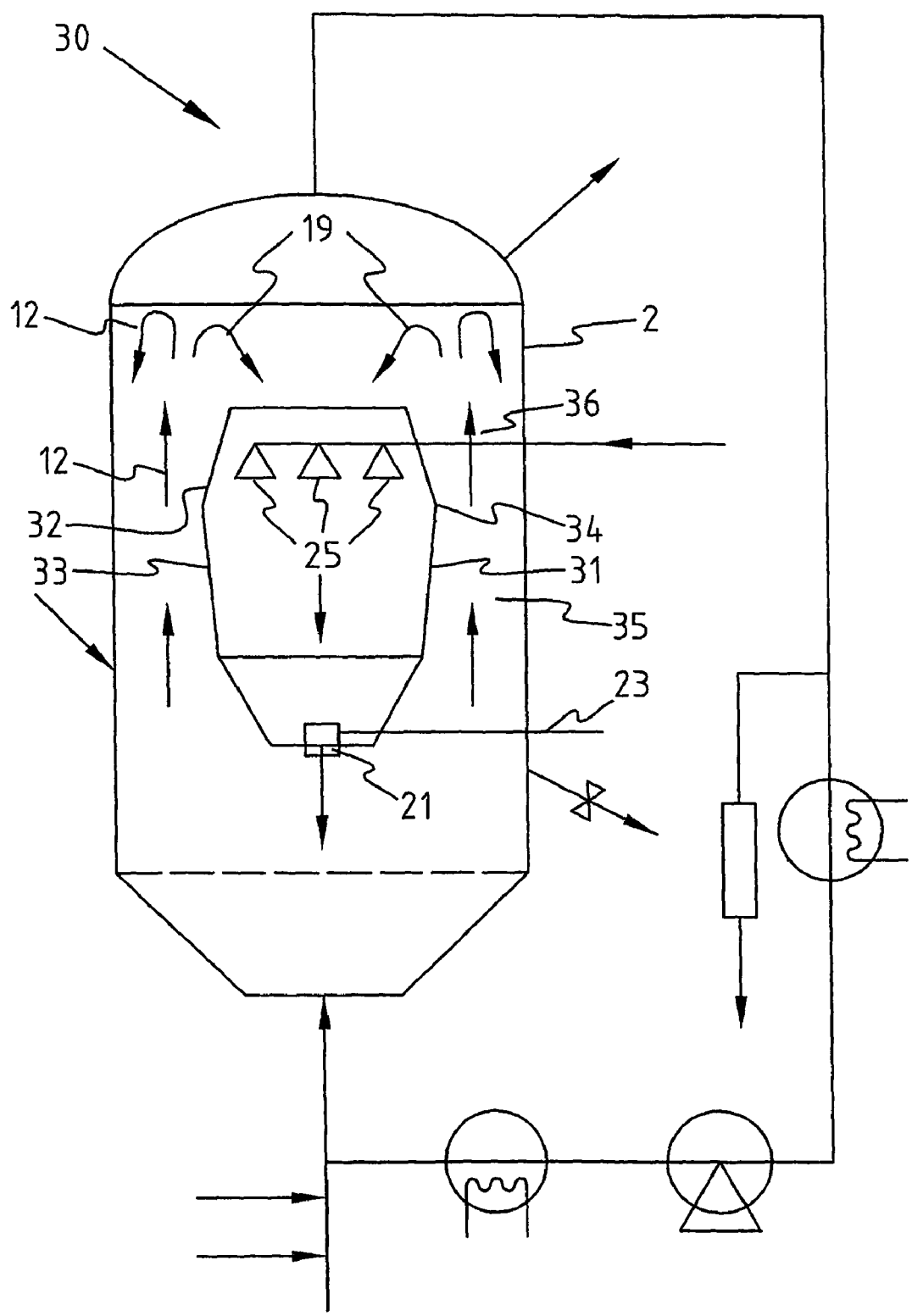

FIG. 3 shows another embodiment of the second polymerization reactor 68 according to the invention comprising the fluidized bed unit 2 and moving bed unit 31 centrally arranged within the fluid bed unit 2. The moving bed unit 31 has a first diverging upper section 32 and a second converging section 33.

Due to the diverging section 32 and converging section 33 is formed a complementary structure in the fluidized bed unit whereby is formed a constrainment 34 dividing the fluidized bed in a lower section 35 and upper section 36 which is beneficial to the stability of the fluidized bed formed.

Figure 4:
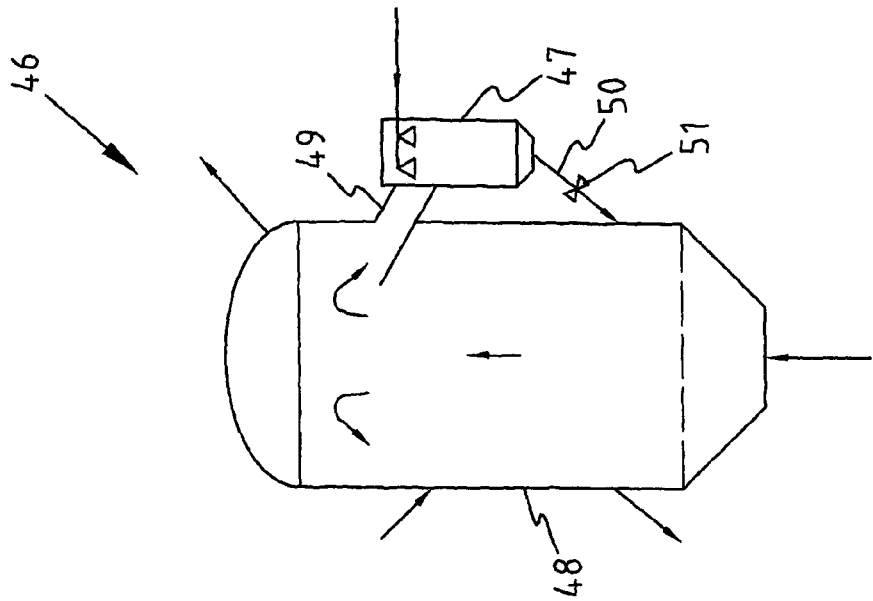

In the reactor 37 shown in FIG. 4 the moving bed reactor 38 only has the form of a cup shape whereby more material form the fluidized bed unit 2 is transferred into the moving bed unit 38.

Figure 5:
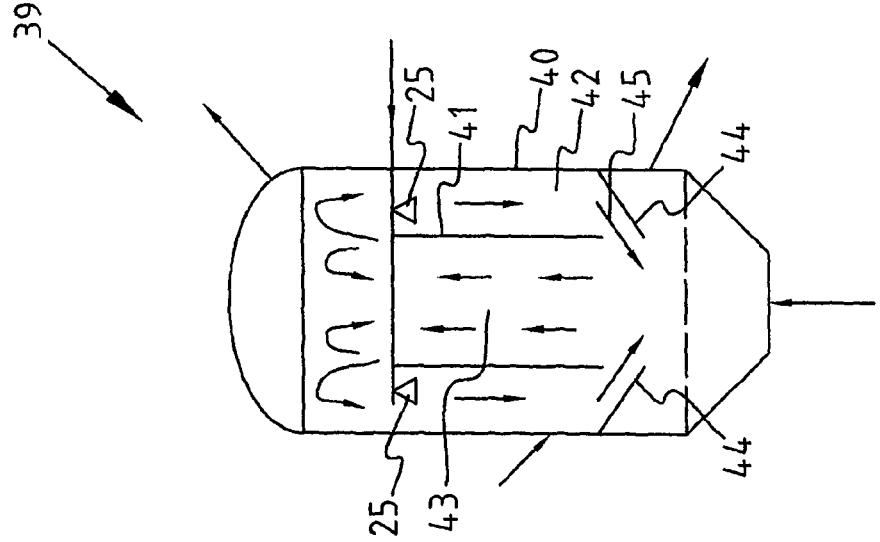
Figure 6:
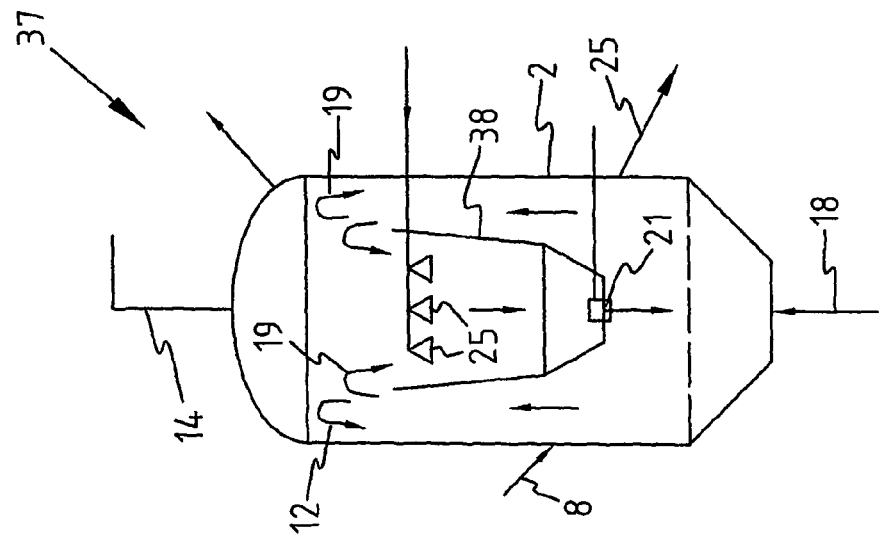

In the reactor system 39 as shown in FIG. 5, the moving bed reactor is formed between an outer wall 40 and a cylindrical inner wall 41, so that the moving bed unit 42 has the form of an annular or hollow cylinder with the fluidized bed unit 43 centrally arranged. The outlet 44 of the moving bed unit 42 is a constrainment in the form of a narrow annular slot trough which in a defined outflow rate particulate material following the arrow 45 flows back into the fluidized bed unit 43.

Finally, the reactor system 46 as shown in FIG. 5 comprise a separate cylindrical moving bed unit 47 arranged outside the fluidized bed unit 48 and is connected to it via an inlet 49 and an outlet 50. The outlet 50 is provided with a control valve 51 for controlling the outflow particulate material form the moving bed reactor into the moving fuidized bed unit.

All the reactor types shown in FIGS. 2-6 provide substantially the same polymer quality if they are operated under similar conditions. Under nearly isothermal conditions, beside typical parameters like temperature, pressure, gas and solid phase composition, "similar conditions" can be defined by the following major variables:
  a) average residence time of solid and gas phase in the whole system
  b) ratio (average fluid bed unit residence time) (average moving bed residence time)
  c) average number of powder cycles through fluidized bed and moving bed per average overall residence time
  d) amount of injected liquid
  e) ratio (amount of solids in fluid bed unit) (amount of solids in moving bed unit)

The fluidization behaviour is influenced by the fluid bed unit and moving bed unit design but is controllable in a wide range of geometric variables.

The results of the following examples did not substantially depend on the specific design when the reactor was operated under "similar conditions". Wall sheeting was never observed. Temperature gradients were always small under all conditions applied.

EXAMPLES

Figure 7:
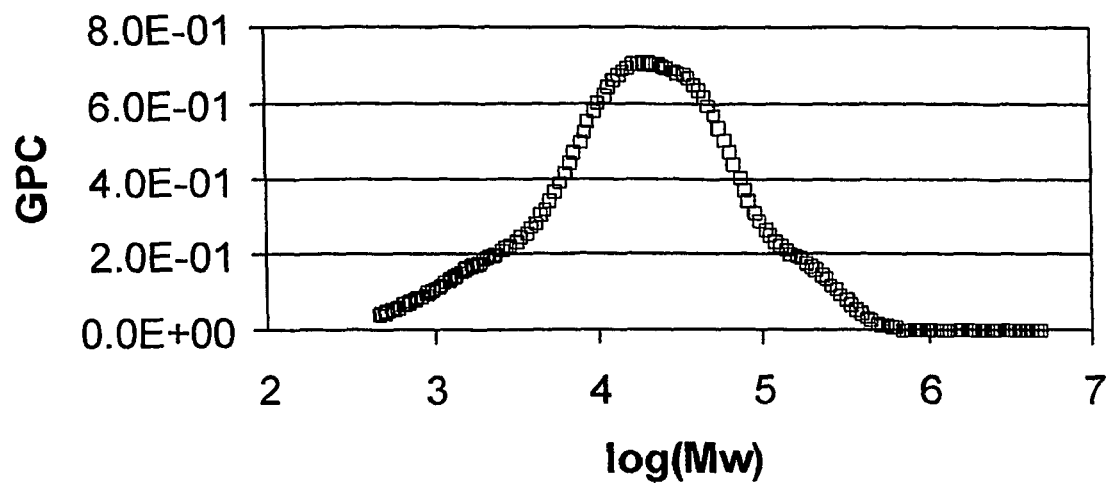

A pilot plant was used with about 500 L fluidized bed and 250 L moving bed volume respectively. The mass flow from the first polymerization (homopolymerization loop reactor, see reactor 63 in FIG. 1) was kept constant in all experiments at about 100 kgh$^{-1}$, which was controlled by feeding of a controlled amount of a MgCl2 supported Ziegler catalysts, about 30 grams/hour. The molecular weight distribution of the homopolymer is shown in FIG. 7.

The weight average molecular weight of the feed was 41 kg mo$^{-1}$ with a polydispersity of PD=7.5. The main reactor was operated at constant pressure, P=25 bar, and constant temperature, T=85° C. The polymer mass flow of the moving bed (=recycle flow) was adjusted at R=500 kg h$^{-1}$ and was kept constant within the operation limits.

The following variables were varied during the experiments:
  1. molar ratio $X_{C4,1}$ in moles butene per mol ethylene in the fluidized bed unit
  2. molar ratio $X_{C4,2}$ in moles butene per mol ethylene in the moving bed unit
  3. molar ratio $X_{H2,1}$ in moles hydrogen per mol ethylene in the fluidized bed unit
  4. molar ratio $X_{H2,2}$ in moles hydrogen per mol ethylene in the moving bed unit
  5. internal recycle ratio Example 1

The following conditions were applied:

$$X_{C4,1}=X_{C4,2}=1$$

$$X_{H2,1}=X_{H2,2}=0.045$$

Figure 8:
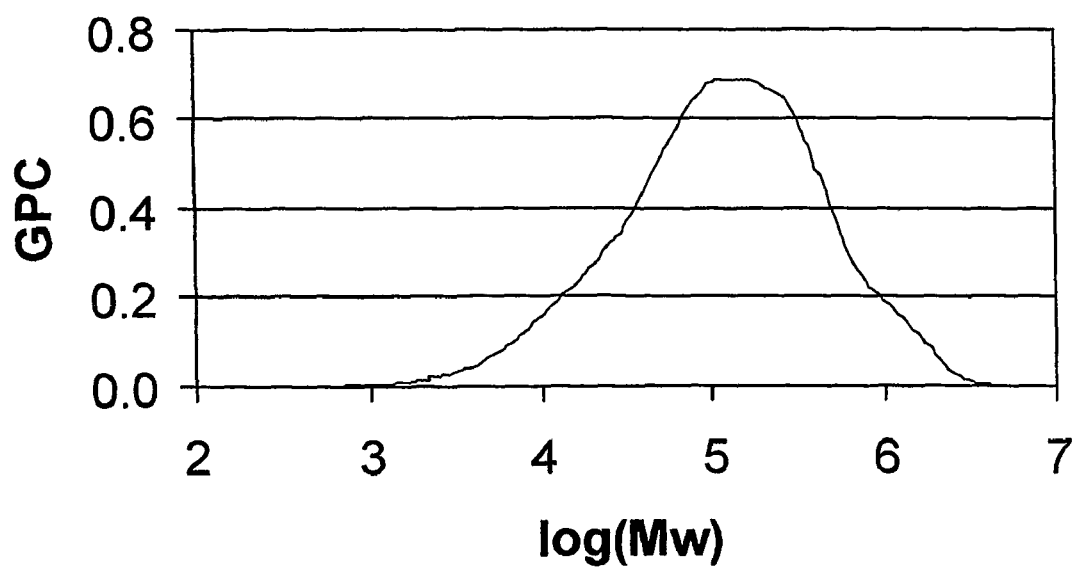

The reaction conditions in both reactor unit do not differ significantly. It can be assumed that both reactor units produced nearly the same polymer quality. 121 kg copolymer per hour was produced in this experiment with a butene content of 2.5 mol % and an average molecular weight of 246 kg mol$^{-1}$. With 500 kg per hour polymer flow in the recycle, the recycle ratio is about 4. The polydispersity of the molecular weight distribution, MWD shown in FIG. 8, is 6.55. The polymer was analyzed by means of a TREF method to estimate the number of butene units per 1000 carbon atoms as function of the molecular weight. This value was multiplied with the amount of polymer produced, which exhibits the given butene units, to get the "chemical distribution" demonstrated in FIG. 9. It was found that the low molecular weight polymer contains more comonomer than the high molecular weight part under these conditions, which can be seen as a specific catalyst property.

Example 2

The following conditions were applied:

$$X_{C4,1}=X_{C4,2}=0.5$$

$$X_{H2,1}=0.3; X_{H2,2}=0.005.$$

This example is to demonstrate the broadening of the molecular weight distribution keeping the chemical gas composition in both reactor units nearly the same. Usually, with this type of catalyst, which produces a broad molecular weight distribution even under constant reaction conditions, it is difficult to produce a bimodal MWD. However, with the reactor described here it was possible to broaden the MWD remarkably by just keeping H2 away from the moving bed.

Figure 10:
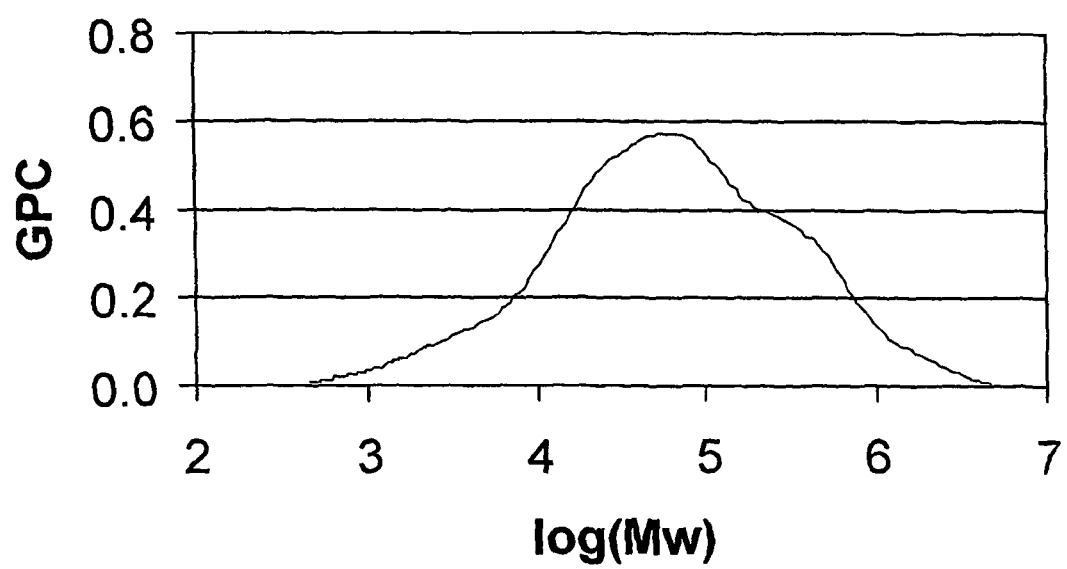

The broad high molecular weight shoulder, see FIG. 10, tends to bimodality. Interestingly, nearly the same polymer production as in example 1 resulted, 120 kg per hour. The average chemical composition was 1.43 mol %; the weight average molecular weight is 202 kg per mol; the polydispersity was large, PD=14.8 was observed.

The peak of the chemical distribution, CD, is lower, corresponding to the lower average comonomer content, but the whole CD is broadened preferably by the influence of the MWD.

Example 3

The following conditions were applied:

$X_{C4,1}=0.1; X_{C4,2}=1$ $X_{H2,1}=0.3; X_{H2,2}=0.005.$

In this experiment, was obtained a similar polydispersity of the MWD as in example 2, PD=14.6, and also the MWD itself looks similar with the enlarged high molecular weight shoulder, but only 105 kg per hour was produced with an average chemical composition of (similar to example 2) 1.58 mol %. Interestingly, by comparing FIG. 10 and FIG. 13, this time the high molecular weight shoulder is enriched with the comonomer which increases the desired product quality strongly.

These examples have shown that manipulation of both MWD and CD is possible in the second polymerization by means of common Ziegler catalysts, just by controlling the gas composition in both reactors independently.

Example 4 demonstrates the influence of the independently controlled recycle ratio based on results of example 3.

Example 4

The following conditions were applied:

$X_{C4,1}=0.1; X_{C4,2}=1$ $X_{H2,1}=0.3; X_{H2,2}=0.005$

R=1350 kgh$^{-1}$ (internal recycle flow).

Figure 15:
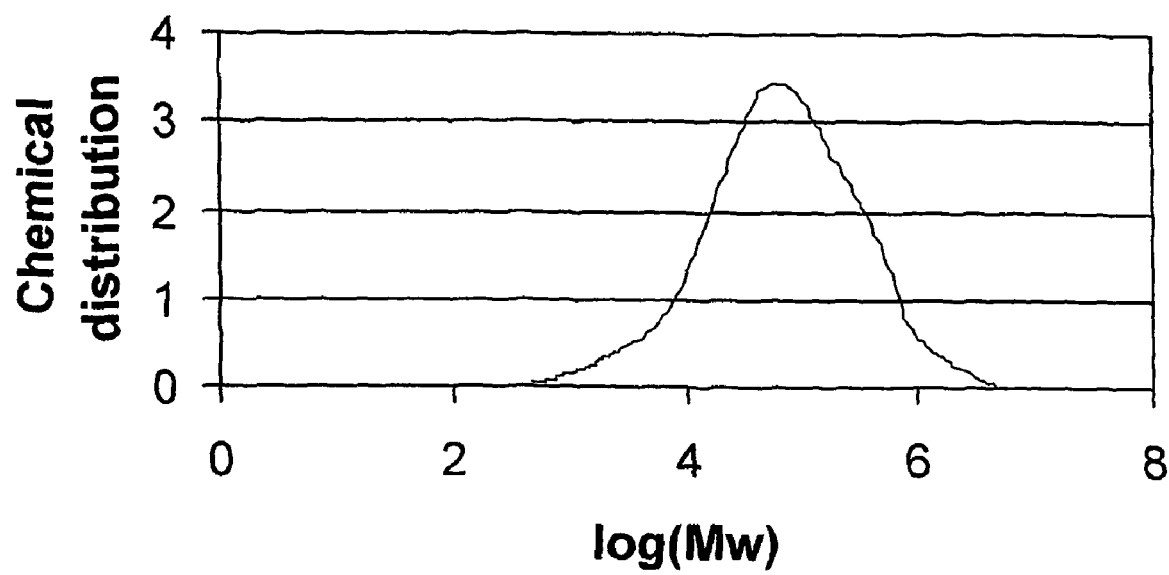

The increased recycle flow in the moving bed unit led to again improved comonomer incorporation, see FIG. 15, at slightly decreased polydispersity, which is PD=13.2 now. At the same time, the average comonomer composition increased to 1.76 mol % as well as the weight average molecular weight reached $M_w=303$ kg mol$^{-1}$. Positive also the polymerization rate change: 126 kg per hour was observed.

LEGEND TO THE FIGS. 7 TO 15

FIG. 7: Molecular weight distribution of the homopolymer polymer from reactor 1.

FIG. 8: Molecular weight distribution, final product, example 1.

Figure 9:
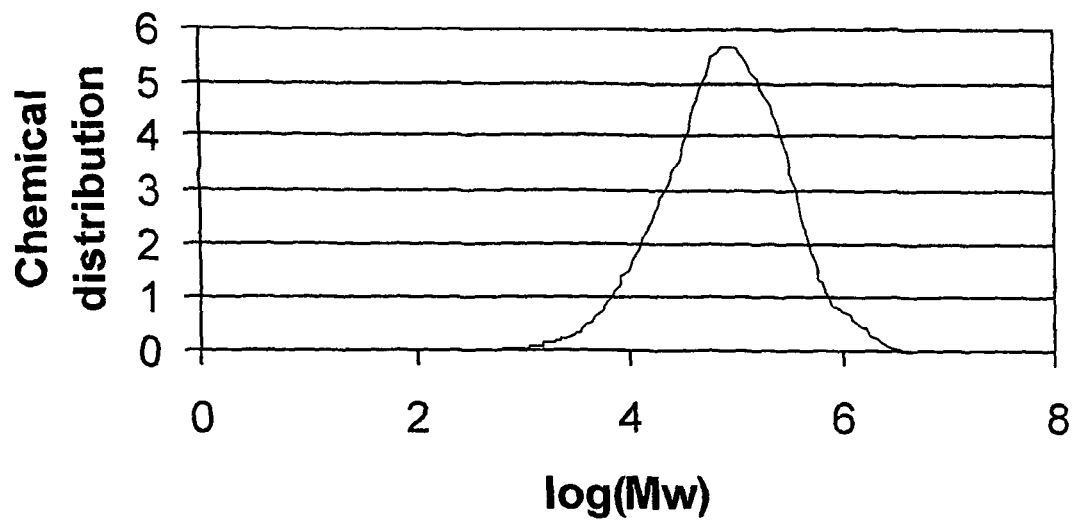

FIG. 9: Chemical distribution, final product, example 1.

FIG. 10: Molecular weight distribution, final product, example

Figure 11:
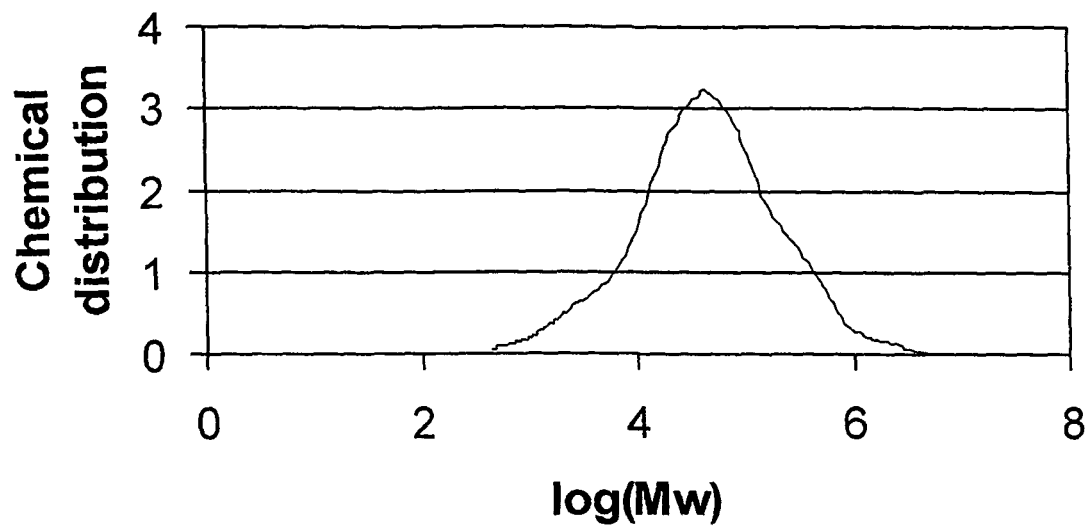

FIG. 11: Chemical distribution, final product, example 2.

Figure 12:
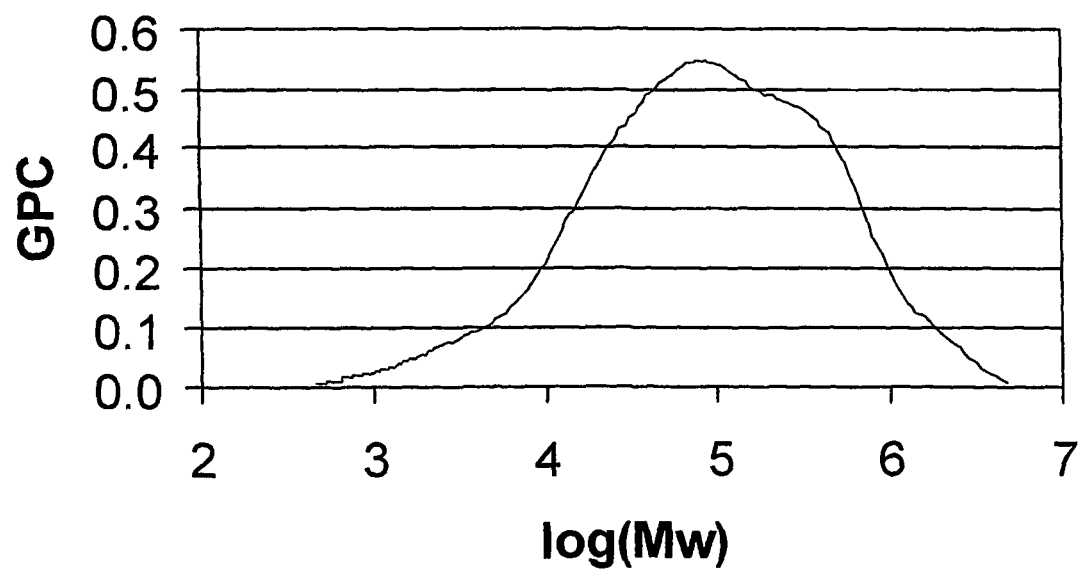

FIG. 12: Molecular weight distribution, final product, example 3.

Figure 13:
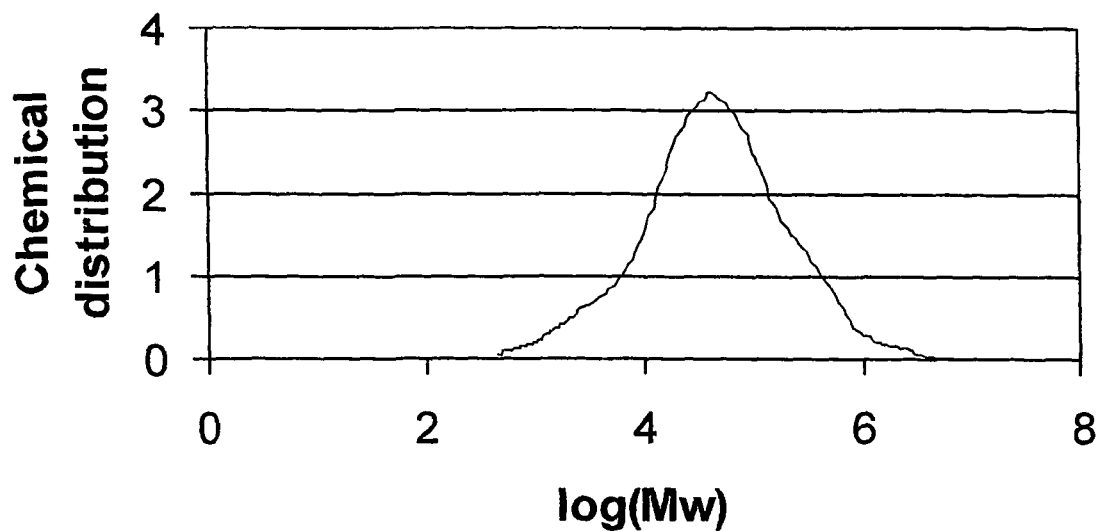

FIG. 13: Chemical distribution, final product, example 3.

Figure 14:
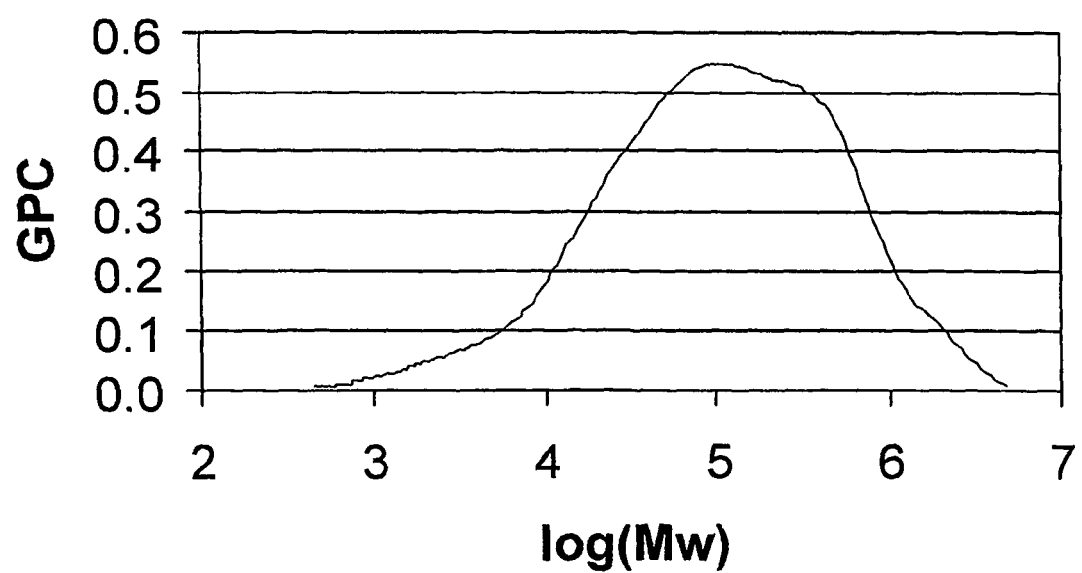

FIG. 14: Molecular weight distribution, final product, example

FIG. 15: Chemical distribution, final product, example 4.

The invention claimed is:

1. Process for the catalytic polymerization of olefins comprising the steps of;
   i) a first polymerization in a first reactor, wherein olefins are polymerized with a particulate catalyst, hydrogen and optional a comonomer in a fluidum of an inert low boiling hydrocarbon medium into an reaction mixture comprising polymerized olefins; and
   ii) a second polymerization in a second reactor, wherein the polymerized olefins are further polymerized in a fluidized bed and in a moving bed by settled polymeric particles moving downwardly in a more or less plug stream under such conditions that the residence time in the fluidized bed and the residence time in the moving bed are independently controlled, wherein the residence time in the moving bed is controlled by controlling the outflow rate of particles from the moving bed.

2. Process according to claim 1, wherein the inert low boiling hydrocarbon medium comprises propane, butane, isobutane, pentane, hexane, heptane, octane, cyclohexane or cycloheptane.

3. Process according to claim 1, wherein the first polymerization is carried out in a liquid phase.

4. Process according to claim 1, wherein the first polymerization is carried out at a temperature of about 75° to 110° C. and a pressure of 40-90 bar.

5. Process according to claim 1, wherein the first polymerization of olefins is carried out under supercritical conditions, wherein the polymerization temperature and pressure are above the corresponding critical points of the mixture formed by the olefins, catalyst, hydrogen, optional comonomer and fluidum of inert low boiling hydrocarbon medium and the polymerization temperature is below the melting point of the formed polymerized olefins.

6. Process according to claim 5, wherein the inert low boiling hydrocarbon is propane.

7. Process according to claim 5, wherein the first polymerization is carried out at a temperature of about 850° -110° C. and a pressure of 60-90 bar.

8. Process according to claim 1, wherein after the first polymerization at least part of the hydrogen, unreacted reactants and inert low boiling hydrocarbon medium are removed from the reaction mixture.

9. Process according to claim 8, wherein at least part of the hydrogen and the inert low boiling hydrocarbon are removed from the polymerized reaction mixture by flashing.

10. Process according to claim 1, wherein the moving bed is separated from the fluidized bed by a separation fluidum.

11. Process according to claim 10, wherein the separation fluidum is supplied to the moving bed.

12. Process according to claim 10, wherein the separation fluidum is a gas or a liquid and selected from the group comprising an inert gas or liquid, such as nitrogen, $C_1$-$C_{12}$-alkane or olefins such as $C_2$-$C_{12}$-alkylene, or mixtures thereof.

13. Process according to claim 12, wherein the separation fluidum is a liquid evaporating under the residing polymerization conditions.

14. Process according to claim 11, wherein liquid olefins are added as separation fluidum such that the polymerization in the moving bed is a condensed mode polymerization.

15. Process according to claim 1, wherein liquid olefins are added to the fluidized bed such that the polymerization in the fluidized bed is in a condensed mode polymerization.

16. Process according to claim 10, wherein the separation fluidum comprises a polymerization monomer or comonomer, or mixture thereof.

17. Process according to claim 1 further comprising a third polymerization carried out in a third reactor.

18. Process according to claim 17, wherein the third reactor is a gas phase reactor.

19. Process according to claim 17, wherein in the third reactor the polymerized olefins are further polymerized in a fluidized bed and in a moving bed such that the residence time in the fluidized bed and the residence time in the moving bed are independently controlled.

20. Process according to claim 1 comprising a pre-polymerization step.

21. Reactor system for the catalytical polymerization of olefins comprising a first polymerization reactor for carrying out the first polymerization, which first reactor comprises inlets for olefins, catalyst, hydrogen, optional comonomer, and inert low boiling hydrocarbon medium, the first reactor further comprises a product outlet for a reaction mixture comprising polymerized olefins; and wherein the product outlet of the first reactor is connected to an inlet of a second reactor for carrying out the second polymerization, which second reactor comprises a reactant inlet, a fluidized bed unit, a moving bed unit and a product outlet, wherein the fluidized bed unit comprises means for maintaining a fluidized bed in the fluidized bed unit, the moving bed unit is provided with an inlet directly connected to the fluidized bed unit such that the residence time in the fluidized bed unit and the residence time in the moving bed unit are independently controlled, and the outlet of the moving bed unit is provided with control valve for controlling the outflow rate of particles from the moving bed unit such that settled polymeric particles move downwardly in a more or less plug stream in the moving bed unit.

22. Reactor system according to claim 21, wherein the first polymerization reactor comprises a loop reactor.

23. Reactor system according to claim 22, wherein the loop reactor is adapted to work under supercritical conditions.

24. Reactor system according to claim 21, wherein the product outlet of the first reactor is connected to removal means for removing hydrogen, unreacted reactants and inert low boiling hydrocarbon medium, and wherein the removal means comprise an outlet for polymerized olefins, which outlet is connected to the inlet of the second reactor.

25. Reactor system according to claim 21, wherein the inlet of the moving bed unit is arranged in the fluidized bed unit.

26. Reactor system according to claim 21, wherein the outlet of the moving bed unit is connected to the fluidized bed unit.

27. Reactor system according to claim 21, wherein the moving bed unit is arranged in, around, adjacent to the fluidized bed unit.

28. Reactor system according to claim 21, wherein the moving bed unit is provided with means for supplying a separation fluidum.

29. Reactor system according to claim 21, wherein the inlet of the moving bed unit is provided with a diverging section 30. Reactor system according to claim 21, further comprising a pre-polymerisation unit connected to the catalyst inlet of the first polymerization reactor.

31. Reactor system according to claim 21, comprising a third reactor for carrying out a third polymerization and connected to the second reactor.

32. Reactor system according to claim 31, wherein the third reactor is a gas phase reactor.

33. Reactor system according to claim 31, wherein the third reactor comprises a reactant inlet, a fluidized bed unit, a moving bed unit and a product outlet, wherein the fluidized bed unit comprises means for maintaining a fluidized bed in the fluidized bed unit and wherein the moving bed unit is provided with an inlet directly connected to the fluidized bed unit such that the residence time in the fluidized bed unit and the residence time in the moving bed unit are independently controlled.

34. Reactor system according to claim 21 comprising a pre-polymerisation reactor.

* * * * *

UNITED STATES PATENT AND TRADEMARK OFFICE
CERTIFICATE OF CORRECTION

PATENT NO.        : 7,781,545 B2                                             Page 1 of 1
APPLICATION NO. : 10/559965
DATED             : August 24, 2010
INVENTOR(S)       : Weickert et al.

It is certified that error appears in the above-identified patent and that said Letters Patent is hereby corrected as shown below:

Column 10, line 38, Claim 7, "at a temperature of about 850° – 110°C."
should read -- at a temperature of about 85° – 110°C. --

Signed and Sealed this

Thirtieth Day of November, 2010

David J. Kappos
*Director of the United States Patent and Trademark Office*